US010034472B2

(12) United States Patent
Prescott, Sr.

(10) Patent No.: US 10,034,472 B2
(45) Date of Patent: Jul. 31, 2018

(54) TREE SEAT AND HAULER DEVICE AND METHOD

(71) Applicant: Stephen J Prescott, Sr., Cornish, ME (US)

(72) Inventor: Stephen J Prescott, Sr., Cornish, ME (US)

( * ) Notice: Subject to any disclaimer, the term of this patent is extended or adjusted under 35 U.S.C. 154(b) by 0 days.

(21) Appl. No.: 14/851,458

(22) Filed: Sep. 11, 2015

(65) Prior Publication Data

US 2016/0081325 A1     Mar. 24, 2016

Related U.S. Application Data

(60) Provisional application No. 62/052,891, filed on Sep. 19, 2014.

(51) Int. Cl.
*A01M 31/02*     (2006.01)
*A01M 31/00*     (2006.01)

(52) U.S. Cl.
CPC .......... *A01M 31/02* (2013.01); *A01M 31/006* (2013.01)

(58) Field of Classification Search
CPC .... A01M 31/00; A01M 31/02; A01M 31/006; B65G 67/04
See application file for complete search history.

(56) References Cited

U.S. PATENT DOCUMENTS

| | | | | |
|---|---|---|---|---|
| 3,860,254 A * | 1/1975 | Wegener | ................. | B62B 1/208 280/652 |
| 4,582,165 A | 4/1986 | Latini | | |
| 4,989,766 A * | 2/1991 | Lewallyn | ............... | A01M 31/02 182/187 |
| 5,433,291 A * | 7/1995 | Shoestock, Sr. | ...... | A01M 31/02 182/136 |
| 5,492,196 A * | 2/1996 | Michno | ................. | A01M 31/02 182/187 |
| 5,624,008 A * | 4/1997 | Beardslee, Jr. | ........ | A63B 27/00 182/136 |
| 5,887,676 A * | 3/1999 | Harbin | .................. | A01M 31/02 182/127 |
| 6,942,228 B2 * | 9/2005 | Bunce | ................. | A01M 31/006 280/1.5 |
| 7,849,964 B2 | 12/2010 | Amacker et al. | | |
| 7,967,325 B1 * | 6/2011 | Burton | ................ | A01M 31/006 280/38 |
| 8,424,639 B1 * | 4/2013 | Davis | ...................... | E06C 1/397 182/115 |
| 2004/0222040 A1 * | 11/2004 | Zirk | .................... | A01M 31/006 182/136 |

(Continued)

FOREIGN PATENT DOCUMENTS

CA     2501122 A1 *     9/2006     .......... A01M 31/006
CA     2501122 A1 *     9/2006     .......... A01M 31/006

*Primary Examiner* — Katherine W Mitchell
*Assistant Examiner* — Candace L Bradford
(74) *Attorney, Agent, or Firm* — Tredecim LLC; Sean L. Sweeney; Taylor A. Noonan (57) ABSTRACT

The present invention is directed to a device that operates as both a tree seat and a hauler and the method of use. The tree seat and hauler device of the present invention includes a main body, a support body and a seat assembly, which may be rotated about an axle to achieve a tree seat position, a hauling position and a packed position. Wheels or skis and a handle are provided for efficient transportation of an animal.

19 Claims, 8 Drawing Sheets

(56) References Cited

U.S. PATENT DOCUMENTS

| | | | |
|---|---|---|---|
| 2007/0169994 A1* | 7/2007 | Oftedahl | A01M 31/006 182/116 |
| 2007/0235255 A1* | 10/2007 | Wallace | A01M 31/006 182/20 |
| 2008/0018063 A1* | 1/2008 | Morowat | B62B 5/068 280/1.5 |
| 2009/0205905 A1* | 8/2009 | Amacker | A01M 31/006 182/20 |
| 2010/0013182 A1* | 1/2010 | Kergosien | A01M 31/02 280/204 |
| 2011/0140382 A1* | 6/2011 | Scheermesser | B62B 1/12 280/47.131 |
| 2014/0008149 A1* | 1/2014 | Fogel | A01M 31/02 182/129 |
| 2014/0238776 A1* | 8/2014 | Vandergraff | A01M 31/02 182/20 |
| 2014/0311824 A1* | 10/2014 | Yoder | A01M 31/006 182/20 |

* cited by examiner

TREE SEAT AND HAULER DEVICE AND METHOD

CROSS-REFERENCE TO RELATED APPLICATION

This application claims the benefit of U.S. Provisional Patent Application No. 62/052,891, filed Sep. 19, 2014, the disclosure of which is herein incorporated by reference.

BACKGROUND

1. Field of the Invention

The present invention pertains to the field of hunting devices. Specifically, this invention relates to a novel device and method of use for a tree seat that converts into a hauler.

2. Discussion of Background Information

Hunters are often required to wait quietly and patiently for long periods of time before their target animals appear. Specifically, deer hunters will often identify an area where animals are known to travel frequently and will then position themselves in a location that gives them a clear line of sight to this location. It is also important that the hunter is positioned in a location where the animal will be unable to detect the hunter's presence. For some animals, such as deer, this requires the hunter to be positioned above the animal's scent line, which is sometimes achieved by taking a position on a hill or other rise with a clear line of sight to the intended target area. In other instances, the hunter may choose to locate in a tree stand or other elevated location.

Once properly located, the hunter must often wait for long periods. The comfort of the hunter's position during this waiting period impacts the hunter's ability to react and perform when the animal arrives. Uncomfortable waiting positions can reduce circulation, resulting in cold or even numb limbs and fingers, which can make it difficult for the hunter to perform when an animal appears. Hunters will often utilize a device such as a stand, a stool, or even a physical feature such as a stump or a rock to provide a comfortable waiting location. However, comfort is not the only consider. It is important that the hunter wait in a position that will allow a quiet transition as the hunter shifts from a waiting position to a hunting position because any excessive sounds may scare off the target animal.

In addition to the proper positioning, hunters must also consider how to remove the animal following a kill. For large game such as deer, it can be quite difficult to remove the animal because a deer usually weighs between 150 and 250 pounds once it has been dressed and can be quite arduous to drag by hand. Removing the animal is especially difficult if the hunter is alone. While haulers can be employed to remove the animal, these devices are often large and cumbersome. Thus, while they may make it easier to transport an animal, they are often difficult to maneuver, especially through any area where the trees are closely spaced.

Prior designs have attempted to combine the functionality of a stand and a hauler. For example, U.S. Pat. No. 5,433,291 discloses a combination tree stand and wheeled game carrier. However, in order to convert between the hauler and the tree stand, the hunter is required to substantially disassemble the device. Such disassembly can be especially difficult during the colder months and can waste valuable time as the hunter converts the device from hauler to tree stand for hunting and then from tree stand back to hauler for transporting an animal. In addition, installing and removing this design in a tree requires the hunter to climb above the ground, which requires more agility than some hunters possess and also increases the risk that the hunter may suffer an injury as the result of a fall.

Another prior design, which is described in U.S. Pat. No. 4,582,165, discloses a pack frame and tree stand combination device. One flaw with this design is that it relies on external straps for tightening the device to a tree. Not only are straps prone to fraying over time, but they are also prone to slipping, especially when attached to trees that have smooth bark. In addition, when used in the hauler configuration, the disclosed design is problematic. Not only does the design provide inadequate support for the head and neck of larger game such as deer, but the hauler configuration also fails to reposition the perpendicular seat portion of the design, which increases the likelihood that the device will get caught by brush or act like a shovel and accumulate snow. These flaws can make it difficult to transport an animal from wooded environments.

Other devices have been proposed to address the problem of comfortably positioning a hunter in the appropriate location and then extracting an animal following a successful kill. However, none of these inventions, taken either singly or in combination, adequately address or resolve the aforementioned problems. Therefore, a need exists for a combined tree seat and hauler device and method that is highly portable and easily converts between a comfortable tree seat position and an efficient hauler.

SUMMARY OF THE INVENTION

The present invention solves the problems associated with locating hunters in a comfortable hunting position and efficiently transporting animals and provides a device and method for comfortably positioning hunters in an optimal hunting position and then efficiently transporting animals following a kill.

The present invention is directed to a tree seat and hauler device that enables comfortable positioning of a hunter in an optimal hunting position and efficient transport of an animal following a kill. The tree seat and hauling device comprises a main body having a lower end and an upper end, wherein engagement teeth are disposed in the upper end; a handle removeably attached to the upper end of the main body; a support body having a lower end and an upper end wherein engagement teeth are disposed in the upper end; one or more seat supports each having an upper end and a lower end wherein stops are disposed on the lower end of the one or more seat supports; a seat body secured to the one or more seat supports; and an axle; wherein the lower end of the main body, the lower end of the support body and the lower end of the one or more seat supports are secured to the axle in a manner that allows the main body, the support body and the one or more seat supports to rotate about the axle.

In addition, the present invention is directed to a method for installing a tree seat and hauler device in a tree. First, the method comprises providing a tree seat and hauler device comprising a main body having a lower end and an upper end and gate disposed between the upper and lower ends, wherein engagement teeth are disposed in the upper end; a handle removeably attached to the upper end of the main body; a support body having a lower end and an upper end wherein engagement teeth are disposed in the upper end and wherein the support body may be temporarily secured to the main body; one or more seat supports each having an upper end and a lower end wherein stops are disposed on the lower end of the one or more seat supports and wherein one or more of the seat supports may be temporarily secured to the support body; a seat body secured to the one or more seat supports and seat wings attached to the seat body; and an axle; wherein the lower end of the main body, the lower end of the support body and the lower end of the one or more seat supports are secured to the axle in a manner that allows the main body, the support body and the one or more seat supports to rotate about the axle. A second step involves releasing the support body from the main body and rotating the support body and secured seat stays forward and away from the main body. A third step involves opening the gate in the main body, inserting a tree into the main body, positioning the tree against the main body engagement teeth, and closing the gate, while a fourth step involves adjusting the angle of the main body until the seat body is at the desired angle and height. A fifth step comprises engaging the main body engagement teeth with the tree and releasing the support body from the seat stays, swinging the support body down toward the tree, and engaging the support body engagement teeth with the tree; and a final step involves opening the seat wings.

In addition, the present invention is directed to a method for loading and hauling an animal with a tree seat and hauler device. First the method comprises providing a tree seat and hauler device comprising a main body having a lower end and an upper end, wherein engagement teeth are disposed in the upper end; a handle, having a hand grip at one end, a threaded section at the other end and a neck support bracket removeably attached to the handle between the hand grip end and the threaded end, wherein the handle is removeably attached to the upper end of the main body via the threaded end; a support body having a lower end and an upper end wherein engagement teeth are disposed in the upper end and wherein the support body may be temporarily secured to the main body; one or more seat supports each having an upper end and a lower end wherein stops are disposed on the lower end of the one or more seat supports and wherein one or more of the one or more seat supports may be temporarily secured to the support body; a seat body secured to the one or more seat supports and seat wings attached to the seat body; and an axle; wherein the lower end of the main body, the lower end of the support body and the lower end of the one or more seat supports are secured to the axle in a manner that allows the main body, the support body and the one or more seat supports to rotate about the axle. Optionally, the provided tree seat and hauler device may further comprise straps attached to the tree seat and hauler device or may further comprise either wheels or skis attached to the ends of the axle. A second step involves releasing the support body from the main body and rotating the support body and the seat assembly forward and away from the main body until the stops engage the main body, while a third step involves opening the seat wings. A fourth step involves ensuring that the handle is securely attached to the main body. A fifth step involves positioning the neck support with relation to the handle to support the neck of an animal and securing the neck support to the handle, and a sixth step involves placing an animal on the tree seat and hauler device with its neck in the neck support, and its lower body resting on the seat body. Optionally, a seventh step involves wrapping the straps around the body of the animal, fastening the straps to secure the animal to the tree seat and hauler device, and securing the animal's neck in the neck support bracket using a strap, a bungee cord, or a piece of rope. Optionally an eighth step involves gripping the handgrip and using the tree seat and hauler device as a cart to move the animal.

BRIEF DESCRIPTION OF THE DRAWINGS

These and other features, aspects and advantages of the present invention will become better understood with reference to the following description, appended claims, and accompanying drawings where:

DETAILED DESCRIPTION OF THE INVENTION

The present device and method allow the positioning of a tree seat in an optimal hunting position and then easily converts to enable efficient transport of an animal. Specifically, the device of the present invention quickly and reversibly transforms between a tree seat and a game-hauling device.

The present invention addresses the problems surrounding comfortable positioning while hunting and the efficient extraction of game following a successful kill. Hunters are unlikely to use devices that are cumbersome to setup or difficult to transport to and from the desired hunting location. The present invention addresses these needs by providing a device that is easy to transport, and converts quickly between a packed position, a hauling position and a tree seat position.

Figure 1:
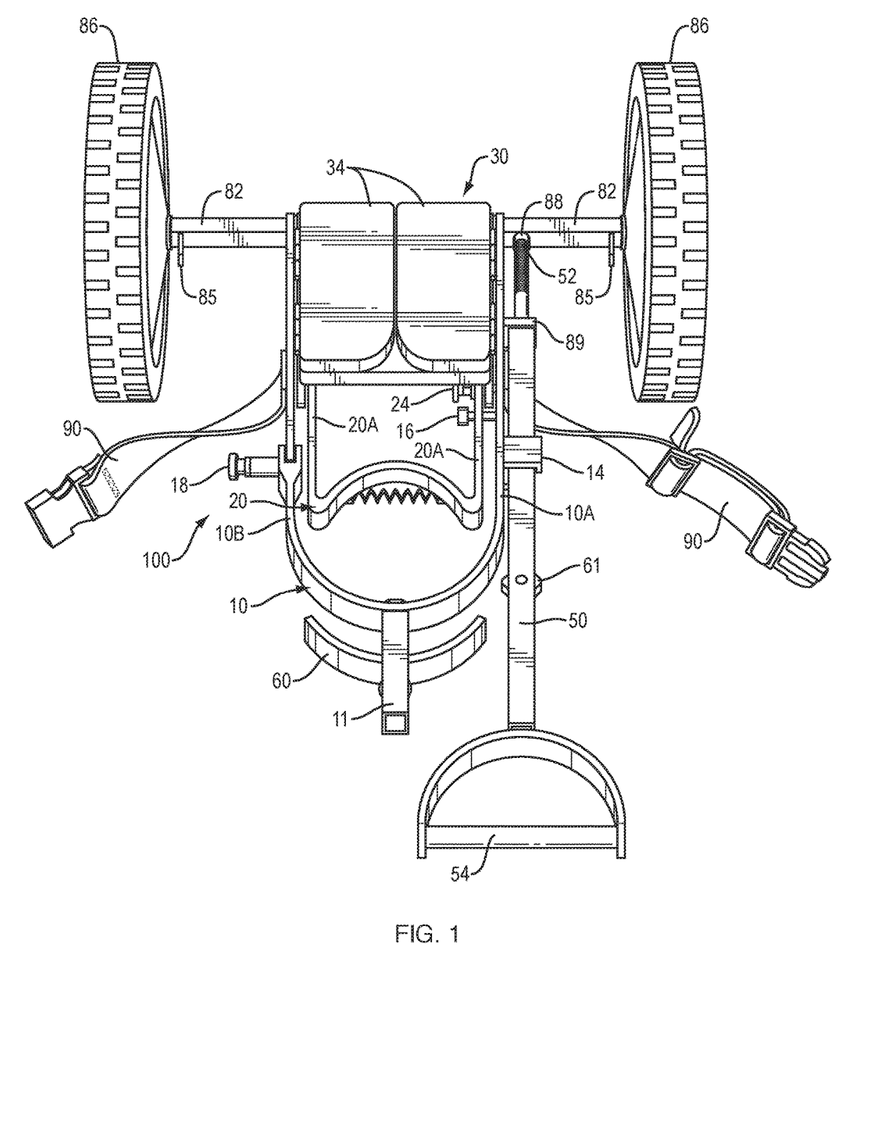
FIG. 1 shows a top view of an embodiment of the tree seat and hauler device of the present invention in the packed position.

FIG. 1 shows one embodiment of the tree seat and hauler device 100 of the present invention in the packed position. In this position, the tree seat and hauler device 100 may be easily attached to a hunter for transport to the hunting location. As depicted in FIG. 1 the tree seat and hauler device 100 comprises a main body 10, a support body 20, a seat assembly 30 and a handle 50. The main body 10, support body 20, and seat assembly 30 are connected at their lower ends via an axle 80, the axle 80 having a first end and a second end, that runs between the wheels 86 in a manner that allows the main body 10, support body 20, and seat assembly 30 to rotate. In the packed position, the main body 10, support body 20, and seat assembly 30 are all secured to enable a hunter to easily carry the tree seat and hauler device 100.

As depicted in FIG. 1, the support body 20 may be secured to the main body 10 via a retractable pin 16 and the support body 20 may be secured to the seat assembly 30 with a separate retractable pin 24. However, one of skill in the art will appreciate that these parts may alternatively be secured via a single thumbscrew, a collection of thumbscrews, a collection of retractable pins, or a combination of thumbscrews and retractable pins.

Between the main body 10 and the wheels 86 there may be an axle spacer 82. The axle spacer 82 is used to reinforce the axle 80 and to space the wheels 86 at an appropriate distance for the tree seat and hauler device 100 to allow a hunter to comfortably sit in the tree seat hauler device 100 when it is in the tree seat position and to hold an animal when the tree seat and hauler device 100 is in the hauling position. As depicted in FIG. 1, the axle spacer 82 may include a socket 88 to accept the threaded end 52 of the handle 50 when the handle 50 is in the packed position. The handle 50 is secured to the main body 10 via a handle bracket 14. The handle bracket 14 creates an aperture for the handle 50 to slide through and may be sized and shaped to create a frictional fit to hold the handle 50 securely in place.

In some embodiments of the present invention, it may be advantageous to utilize a tab 89 with an aperture sized to accept the threaded end 52 of the handle 50 either in place of, or in addition to, the socket 88. When used, the tab 89 may be secured to the main body 10, with the aperture oriented such that the handle 50 can be inserted into the handle bracket 14 and the threaded end 52 of the handle 50 can then be passed through the aperture of the tab 89, thereby securing the handle 50 to the main body 10.

Further, the handle bracket 14 may be sized to permit some play between the handle bracket 14 and the handle 50, enabling easier insertion and removal of the handle 50. Where it is desirable to more securely attach the handle 50, a threaded fastener may extend through the main body 10 to compress the handle 50 against the handle bracket 14, thereby securely holding the handle 50 in position. Alternatively, the threaded fastener may extend through the handle bracket 14, securing the handle 50 against the main body 10.

Straps 90 may be attached to the main body 10 to enable a hunter to wear the tree seat and hauler device 100 on his or her back when the tree seat and hauler device 100 is in the packed position. In addition, the seat wings 34 may be extended to the side, such that when the straps 90 are secured around the hunter's waist the seat wings 34 are compressed against the hunter, thereby further securing the tree seat and hauler device 100 in place on the hunter's back.

In some embodiments, the straps 90 may be attached via strap attachment loops 85 located on the axle spacer 82. Strap attachment loops 85 provide the benefit of facilitating quick attachment and detachment of the straps 90 via clips or other removable attachment means. In addition, some embodiments may utilize shoulder straps further securing the tree seat and hauler device 100 to the hunter's back much like a traditional backpack. As shown more clearly in FIG. 2, a threaded fastener 66 provides an additional attachment point, facilitating the use of shoulder straps. When utilized, shoulder straps could be fixedly or removably secured to the threaded fastener 66 as known to one of skill in the art. Alternatively, the shoulder straps could be secured to the handle attachment post 11, the attachment tab 17, or the auxiliary support bracket 64.

Figure 2:
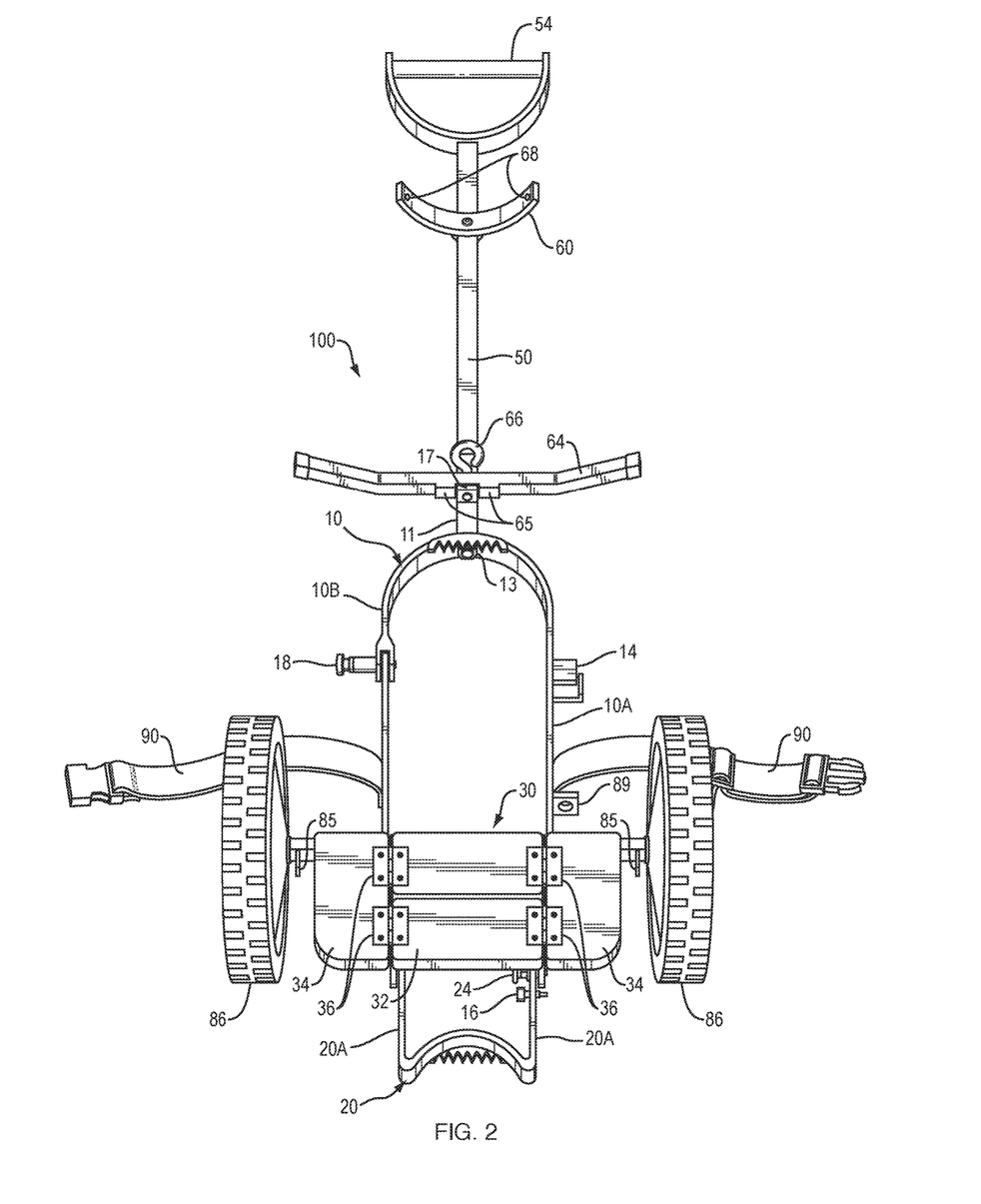
FIG. 2 shows a top front view of an embodiment of the tree seat and hauler device of the present invention in the hauling position.

FIG. 2 depicts the tree seat and hauler device 100 in the hauling position. As noted above, the main body 10, support body 20, and seat assembly 30 are connected at their lower ends via an axle 80, and converting the tree seat and hauler device 100 between the packed position and the hauling position is achieved without removing the main body 10, support body 20, and seat assembly 30 from the axle 80. In order to convert between the packed position and the hauling position, the handle 50 is withdrawn from the handle bracket 14 and the support body 20 is allowed to rotate freely by retracting retractable pin 16. Once removed from the handle bracket 14, the threaded end 52 of the handle 50 is inserted into the handle attachment post 11 of the main body 10. The handle attachment post is hollow and a nut 13 is located on the underside of the main body 10, allowing the threaded end 52 of the handle to be secured into the handle attachment post 11 by rotating the handle 50 to engage the threads of the threaded end 52 of the handle 50 with the nut 13.

The handle 50 may be attached to the main body 10 in a variety of ways without deviating from the scope of the present invention. For example, the handle attachment post 11 or the main body 10 may include a threaded hole, obviating the need for the nut 13. Alternatively, the handle 50 may be shaped to slide into the handle attachment post 11, and a pin or threaded fastener may be inserted through both the handle attachment post 11 and the handle 50.

As depicted in FIG. 2, the tree seat and hauler device 100 may include an auxiliary support bracket 64, which is sized and shaped to provide additional support to the midsection of an animal during the hauling process. The auxiliary support bracket 64 can be attached to the attachment tab 17, located on the handle attachment post 11. In addition, in some embodiments it may be advantageous to include tabs 65 or stops to ensure that the auxiliary support bracket 64 stays fixed and does not rotate once connected to the attachment tab 17. Preferably, the auxiliary support bracket 64 is secured to the attachment tab 17 using a threaded fastener 66. The threaded fastener 66 may be an eye bolt. When the auxiliary support bracket 64 is attached to the tree seat and hauler device 100, via the attachment tab 17, the tree seat and hauler device 100 may be transformed between its hauling, packed, and tree seat positions without any interference from the auxiliary support bracket 64. Accordingly, the auxiliary support bracket may be fixedly attached to the tree seat and hauler device in some embodiments.

Figure 3:
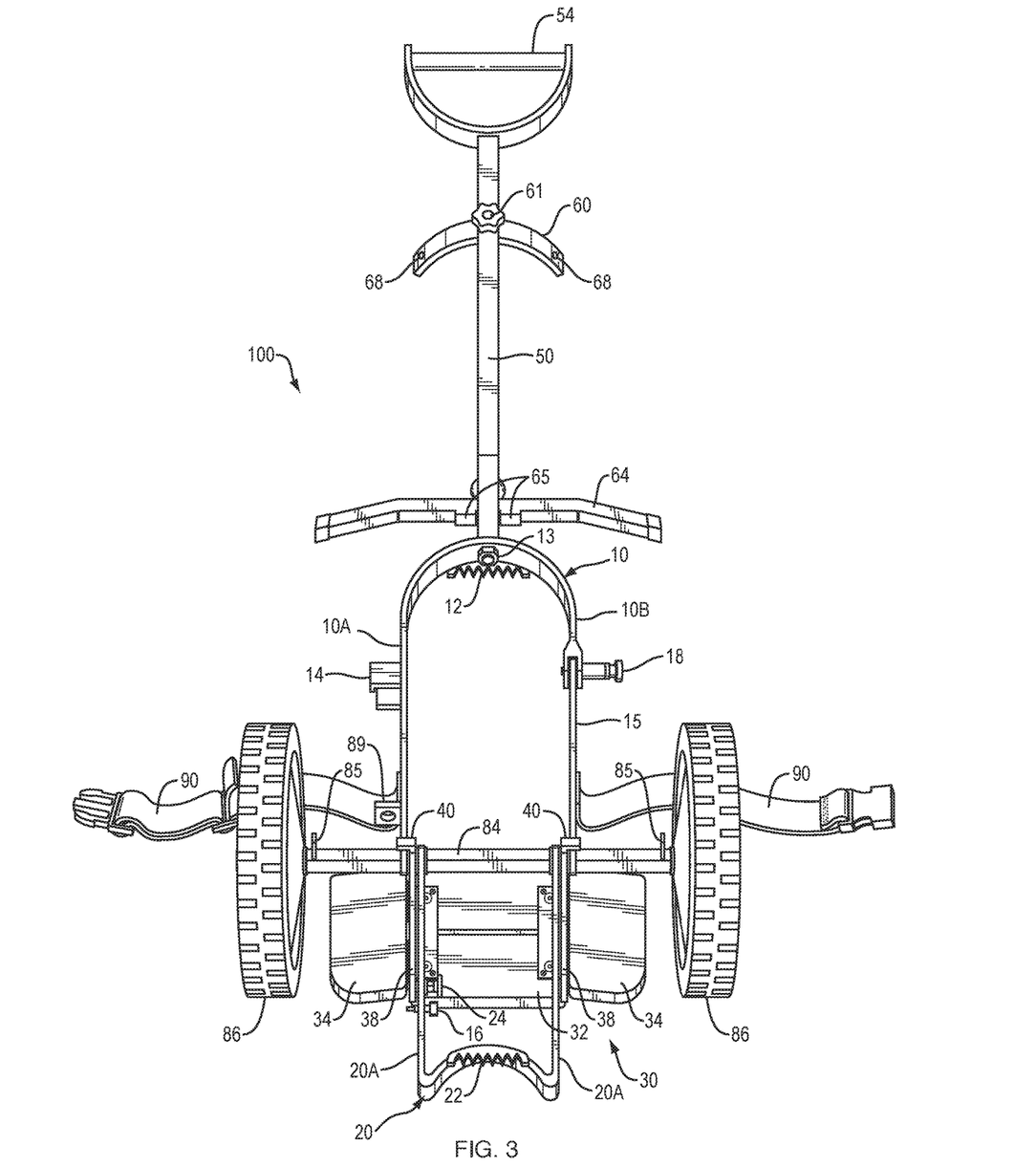
FIG. 3 shows a bottom front view of an embodiment of the tree seat and hauler device of the present invention in the hauling position.

Turning to FIG. 3, the seat supports 38 connect to the seat body 32. In the hauling position, the support body 20 is secured to the seat supports 38 via a retractable pin 24. In this position, the support bracket 20 adds additional support to the seat assembly 30 and helps bear the weight of the animal during hauling. The base of the seat supports 38 includes stops 40, which limit the rotation of the seat assembly 30 about the axle 80. When the support body 20 is secured to the seat assembly 30, the stops 40 also limit the rotation of the support body 20 about the axle 80. When placing the tree seat and hauler device 100 in the hauling position, the support body 20 is rotated forward until the stops 40 contact the lower portion of the main body 10. Returning to FIG. 2, once the support body 20 is rotated forward, the seat wings 34, which are connected to the seat body 32 with hinges 36, can be extended, increasing the surface area supporting the animal.

To further support the animal, the neck support 60 is installed along the handle 50. The neck support 60 is attached to the handle 50 using a threaded fastener 61, which is secured via a threaded hole in the neck support 60. Alternatively, a nut may be used in place of the threaded hole in the neck support 60. In some embodiments, a dedicated bracket in the form of a spring clip is disposed on the handle to accept the neck support 60. In this configuration, the neck support 60 is inserted into the clip and held in place by frictional forces or a combination of frictional forces and a pin. When not in use, the neck support 60 may remain on the handle or may be stored by attaching the neck support 60 to the main body 10 via the attachment tab 17.

When in the hauling position as depicted in FIGS. 2 and 3, the support body 20 preferably remains secured to the seat assembly 30 to provide added support to the seat assembly and to ensure that the seat assembly 30 does not bounce while the hunter is hauling an animal. In addition, the straps 90, which were used to secure the tree seat and hauler device 100 to the hunter for transport in the packed position can be used to secure the animal when the tree seat and hauler device 100 is in the hauling position by wrapping the straps 90 around the animal and tightening the straps 90 securely. In addition to the straps 90, a hunter may wish to secure the neck of the animal in the neck support bracket 60 using straps, bungee cords, rope, or similar means. To facilitate fastening of the animal neck, some embodiments of the neck support bracket 60 may include holes 68 disposed near the outer edges of the bracket as shown in FIGS. 2 and 3.

The wheels 86 are sized to permit the easy transportation of an animal over the rough terrain often encountered in the woods. Preferably the wheels 86 are of solid construction to increase durability and have a diameter of at least 8 inches. However, the wheels may be of any construction known in the art and, in areas where hunters are likely to encounter rocks, small branches, and irregular dips and rises while hauling the tree seat and hauler device 100, wheels 86 larger than 8 inches may be used to improve the clearance, maneuverability and efficiency of the tree seat and hauler device 100. Preferably, the wheels 86 are attached to the axle 80 using a washer and a cotter pin to facilitate easy removal or replacement of the wheels 86. However, the wheels 86 may be attached using a nut, a snap ring or any similar connector as known in the art.

Figure 4:
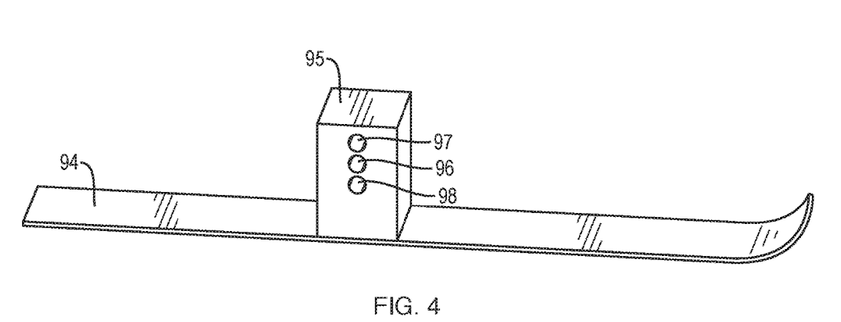
FIG. 4 shows a side perspective view of a ski of the present invention.

In areas where snow is present during hunting season, it may be advantageous to replace the wheels 86 with skis 94 such as those depicted in FIG. 4. Skis 94 may be secured to an attachment block 95 that provides the necessary clearance for the tree seat and hauler device 100 to travel over uneven terrain. The attachment block 95 includes at least one hole 96 adapted to accept the axle 80 so that the attachment block 95 can be secured in a manner similar to the wheels 86. In some embodiments, however the attachment block 95 may contain additional holes 97, 98, allowing the hunter to select the most appropriate clearance based on the local terrain, the depth of the snow, and the size of the animal being transported.

Returning to FIGS. 2 and 3, the handle 50 includes a handgrip 54, which provides the hunter with a place to easily grip the tree seat and hauler device 100 during hauling. The handgrip 54 may be fixed to the handle 50, or it may be attached in a manner that allows the handgrip 54 to rotate. Where the handgrip 54 is connected in a manner that permits rotation, the handgrip 54 may rotate freely or the handgrip 54 may be constrained so that it rotates less than 360 degrees. In embodiments where the handgrip 54 is permitted to rotate, it can be attached to the handle 50 by inserting a protrusion on the end of the handle 50 into a corresponding hole in the handgrip 54. The protrusion may be threaded to accept a nut, or it may be smooth and secured using a cotter pin, snap ring or similar fastener. Alternatively, the protrusion may extend from the handgrip 54. In this embodiment, the handgrip 54 protrusion would be inserted into the handle 50 and secured using a pin or threaded connector as know in the art. Alternatively, the hand grip 54 protrusion may be adapted to accept the handle 50, whereby the handle 50 is inserted into the protrusion and secured using a pin or threaded connect as known in the art. Persons of skill in the art will appreciate that rotation of the hand grip 54 may be permitted or prohibited based on the manner in which the handgrip 54 is attached to the handle. In addition, persons of skill in the art will appreciate that the degree of rotation may be easily limited by using stops, elongated slots and other means as known in the art.

As described above, the handle 50 is attached to the main body 10 by securing the threaded end 52 to main body 10 via the handle attachment post 11. At the bottom of the handle attachment post 11, a nut 13 accepts the threaded end 52 of the handle 50 and the handle 50 is then rotated to secure the handle 50 to the main body 10. Persons of skill in the art will appreciate that handle attachment post 11 or main body 10 may be adapted with a threaded hole section to accept the threaded end 52 of the handle 50 and remove the need for the nut 13. Alternatively, the threaded connection may be replaced entirely and the connection between the handle 50 and the main body 10 may be achieved by either inserting the handle 50 into the handle attachment post 11 or inserting the handle attachment post 11 into the handle 50 and then securing the two parts together with either a threaded fastener or a pin. The handle 50 and the main body 10 may be attached in a manner that permits rotation of the handle 50, either by not completely threading the handle 50 into the handle attachment post 11 or by using an alternative attachment method that facilitate rotation as described in the context of the hand grip 54. Similar to the rotation of the handgrip 54, the rotation of the handle 50 may be limited using methods known to persons of skill in the art.

In some embodiments, the handle 50 may be extendable. For example, the handle 50 may be comprised of multiple parts where an inner portion is nested within an outer portion. The hunter may then extend the handle by removing a portion of the inner portion. In this embodiment, the handle 50 may include one or more stops where a threaded fastener, such as threaded fastener 61, or a pin can be used to secure the inner portion and the outer portion at the desired length.

As best shown in FIG. 3, the upper portions of both the main body 10 and the support body 20 are preferably curved to facilitate installation of the tree seat and hauler device 100 in the tree seat position. Disposed in the curved upper portion of the main body 10, is the main body teeth assembly 12, which includes a series of teeth designed to securely grip the trunk of a tree. The main body teeth assembly 12, which is disposed in the curved upper portion of the main body 10, is oriented such that the teeth are directed substantially inwards, e.g., the points of the teeth substantially face the axle 80.

Further, as shown best in FIG. 3, the main body 10 has a pair of main body arms in the form of a main body arm 10A and a main body gate arm 10B. The main body arm 10A extends from one side of the curved upper portion of the main body 10 and extends to the axle 80. Preferably, the axle 80 passes through an aperture at the lower end of the main body arm 10A, securely connecting the main body arm 10A thereto. However, one of skill in the art will appreciate that the lower end of the main body arm 10A may be fastened to the axle 80 in any manner that provides a secure connection and enables rotation of the main body 10 about the axle 80. The main body gate arm 10B extends from the opposite side of the curved upper portion of the main body 10, extends toward the axle 80, and terminates in a lower end such that the main body gate arm does not extend all the way to the axle 80. Instead, the lower end of the main body gate arm 10B removably connects to a gate 15, with the gate 15 extending to the axle 80. Similar to the main body arm 10A, the gate 15 is securely connected to the axle 80 in a manner that permits rotation about the axle 80.

The gate 15 may be secured to the lower end of the main body gate arm 10b via a retractable pin 18. In such circumstances, when the retractable pin 18 is released, the gate 15 is permitted to rotate freely about the axle 80, creating an opening in the main body 10. The size and length of the gate 15, in conjunction with the width of the main body 10, determine the size tree that will accept the tree seat and hauler device 100 in the tree seat position.

As also best depicted in FIG. 3, the support body 20 has a pair of support body arms 20A. The pair of support body arms 20A originate at each side of the curved upper portion of the support body 20 and extend to the axle 80. At the lower ends, each of the pair of support body arms 20A are securely connected to the axle 80 such that the support body 20 may rotate freely about the axle 80. Further, the curved upper portion of the support body 20 includes a support body teeth assembly 22, which includes a series of teeth designed to securely grip the trunk of a tree. The support body teeth assembly 22, which is disposed in the curved portion of the support body 20, is oriented such that the teeth are directed substantially outwards, e.g., the points of the teeth face substantially away from the axle 80.

Figure 5:
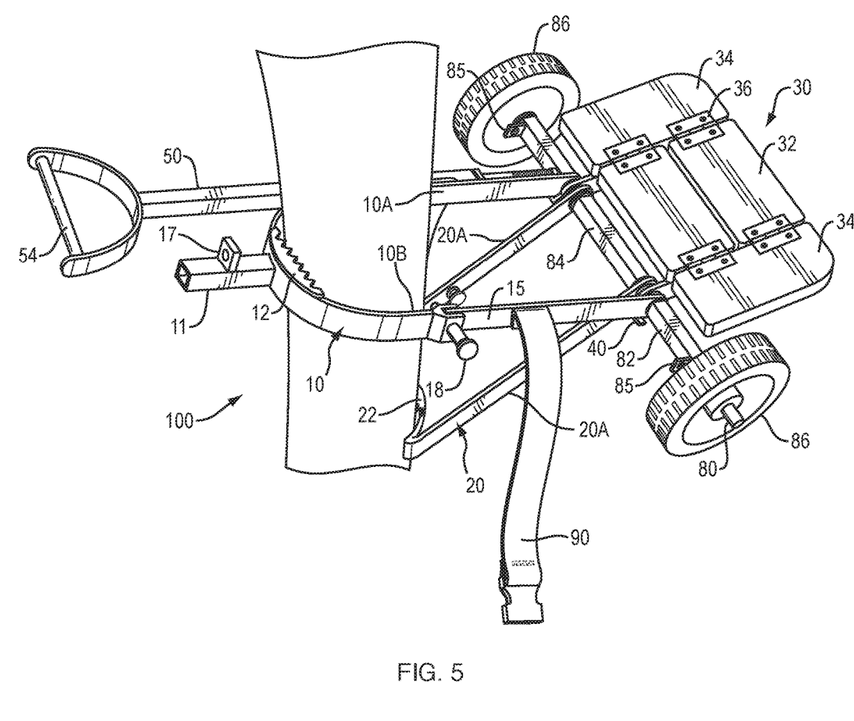
FIG. 5 shows a perspective view of an embodiment of the tree seat and hauler device of the present invention installed in a tree in the tree seat position.

Turning to FIG. 5, the tree seat and hauler device 100 is shown installed in a tree in the tree seat position. As described previously, converting the tree seat and hauler device 100 between the packed position and the hauling position is achieved without removing the main body 10, support body 20, and seat assembly 30 from the axle 80; converting the tree seat and hauler device 100 to the tree seat position is similarly achieved without removing the main body 10, support body 20, and seat assembly 30 from the axle 80. In the tree seat position, the support body 20 and seat assembly 30 are both released and the main body 10 and the support body 20 are engaged with the tree on opposite sides of the tree, while the seat assembly 30 is positioned at the height and angle preferred by the hunter. As previously described, the support body 20, which is secured to the seat assembly 30 in the packed and hauling positions, is released from the main body 10 by withdrawing retractable pin 16 and the support body 20 is released from the seat assembly 30 by retracting retractable pin 24. In many instances, a hunter may wish to release the support body 20 from the main body 10, but leave the support body 20 secured to the seat assembly 30, similar to the hauling position, in order to simplify the initial installation steps.

As depicted, the handle 50 is attached to the main body 10 via the handle bracket 14. However, the position of the handle 50 does not impact the ability to install the tree seat and hauler device 100 in a tree in the tree seat position. For example, the handle 50 may be connected to the handle attachment post 11, similar to the hauling position, or removed from the tree seat and hauler device 100, without interfering with the ability to position the tree seat and hauler device 100 in the tree seat position.

In order to install the tree seat and hauler device 100 in a tree, the support body 20 and the seat assembly 30 must be rotated forward so that the interior of the main body 10 is empty. From this position, the gate 15 is released by retracting retractable pin 18. With the retractable pin 18 released, the gate 15 is free to rotate about the axle 80, and an opening is created in the main body 10. With the gate 15 in the open position, the tree seat and hauler device 100 may be positioned around a tree by passing the tree trunk through the opening in the main body 10 created by the open gate 15. Once the tree is positioned within the main body 10, the gate 15 may be closed and secured in place with the retractable pin 18.

With the tree positioned inside the main body, the hunter can engage the main body teeth assembly 12 with the tree. Once the main body teeth assembly 12 is engaged with the tree, the seat assembly 30 will rotate forward until the stops 40 contact the lower portion of the main body 10. If the support body 20 is secured to the seat assembly 30, the rotation of the support body 20 will also be limited by the stops 40. In order to securely fasten the tree seat and hauler device 100 to the tree, the support bracket 20 must be released from the seat assembly 30, allowing the support body 20 to rotate freely about the axle 80.

To finalize the position of the tree seat and hauler device 100, the hunter adjusts the height and angle of the main body 10 until the main body teeth assembly 12 is engaged in a manner where the seat assembly 30 is substantially level and positioned at the desired height. The support body 20 is then rotated toward the tree, engaging the support body teeth assembly 22. As depicted in FIG. 5, the main body teeth assembly 12 and the support body teeth assembly 22 engage the tree on opposite sides. As a result, when weight is applied to the seat assembly 30 in the tree seat position, the force applied to the main body teeth assembly 12 and the support body teeth assembly 22 further engaged the teeth assemblies 12, 22 and further secure the tree seat and hauler device 100 to the tree. As depicted, the seat wings 34 are extended to provide an ample seat where the hunter can comfortably wait for the game to arrive.

The tree seat and hauler device 100 can be installed in any tree that fits within the main body 10 and is of sufficient size to support the weight of the hunter. While the main body 10 can be sized to enable engagement with very large trees, it is preferable that the width of the main body 10 be in the range of 4 to 10 inches to maintain the portability of the tree seat and hauler device 100 both when it is being transported by the hunter in the packed position and when the device is being utilized in the hauling configuration.

Returning to FIG. 3, where the tree seat and hauler device 100 is shown in the hauling position, the main body 10, support body 20, seat assembly 30 and wheels 86 are all attached to the axle 80. The wheels 86 are installed on the axle 80 and spaced from the main body 10 by an axle spacer 82. The axle spacer 82 ensures that the wheels 86 are at the appropriate width and may be smaller or larger depending on the chosen width for the main body 10. Some embodiments may remove the axle spacer 82 entirely.

Nested within the main body 10 is the seat assembly 30, which is connected to the axle 80 at the lower end of the seat supports 38. Nested within the seat assembly 30 is the support body 20, which is also connected to the axle 80 at the lower end of the support body 20. Preferably, the main body 10 is spaced from the seat assembly 30 and the seat assembly 30 is spaced from the support body 20 using washers and a seat assembly spacer 84. The addition of washers or other spacers ensures that the parts will rotate more freely as the tree seat and hauler device 100 is configured in the packed, hauling and tree seat positions, while the seat assembly spacer 84 ensures that the components maintain their proper alignment as they rotate about the axle 80 and weight is applied to the tree seat and hauler device 100.

Figure 6:
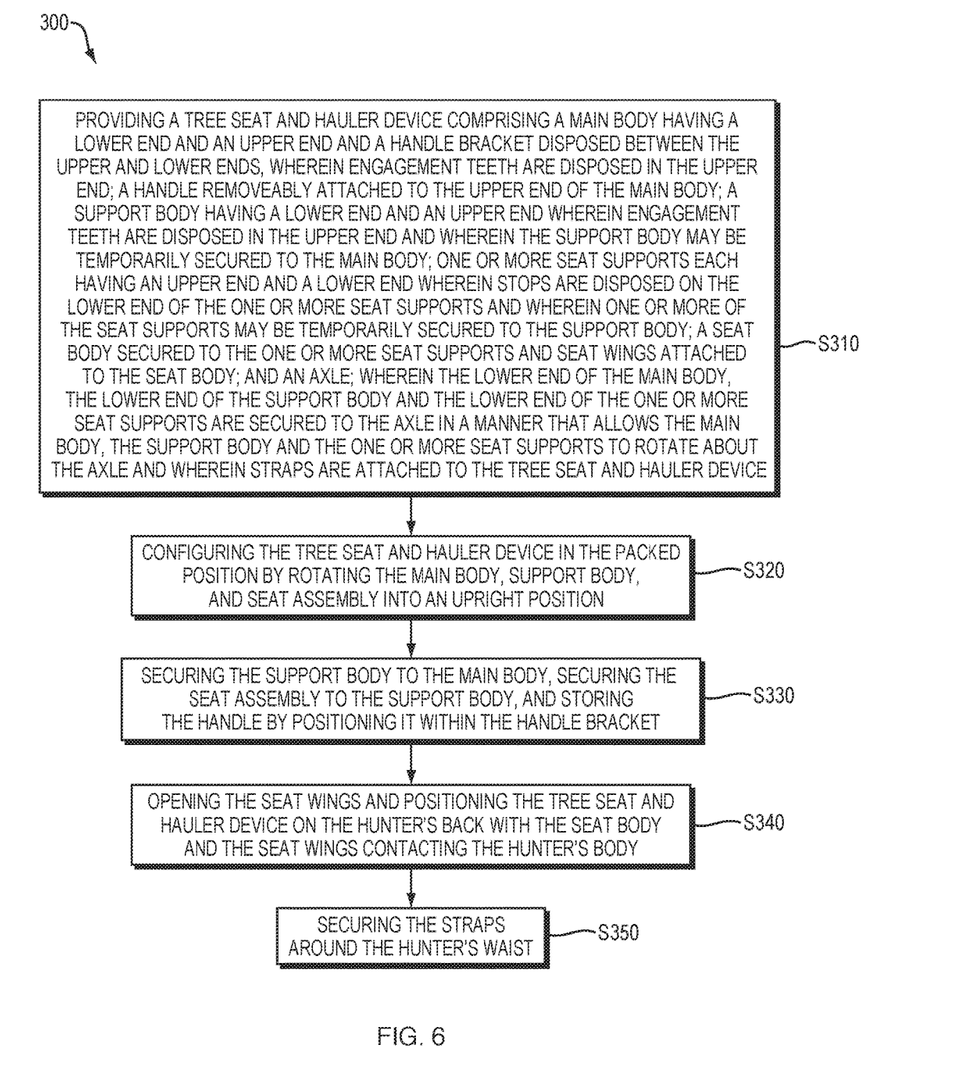
FIG. 6 shows the steps of one method of the present invention.

Several methods exist for using the tree seat and hauler device 100 of the present invention. Turning to FIG. 6, a first method 300 for securing the invention to a hunter's back for transport to or from the hunting site is depicted. A first step S310 comprises providing a tree seat and hauler device 100. A second step S320 comprises configuring the tree seat and hauler device in the packed position by rotating the main body 10, support body 20 and seat assembly 30 into the upright position. A third step S330 comprises securing the support body 20, which may include engaging retractable pin 16, securing the seat assembly 30, which may include engaging retractable pin 24, and storing the handle 50 by positioning it within the handle bracket 14. Once in the packed position, a fourth step S340 comprises opening the seat wings 34 and positioning the tree seat and hauler device 100 on the hunter's back with the seat body 32 and the seat wings 34 contacting the hunter's body. A fifth step S350 comprises securing the straps 90 around the hunter's waist to secure the tree seat and hauler device 100. Where the tree seat and hauler device 100 includes shoulder straps, the hunter may position and tighten the shoulder straps to further secure the tree seat and hauler device 100 on his or her back.

Figure 7:
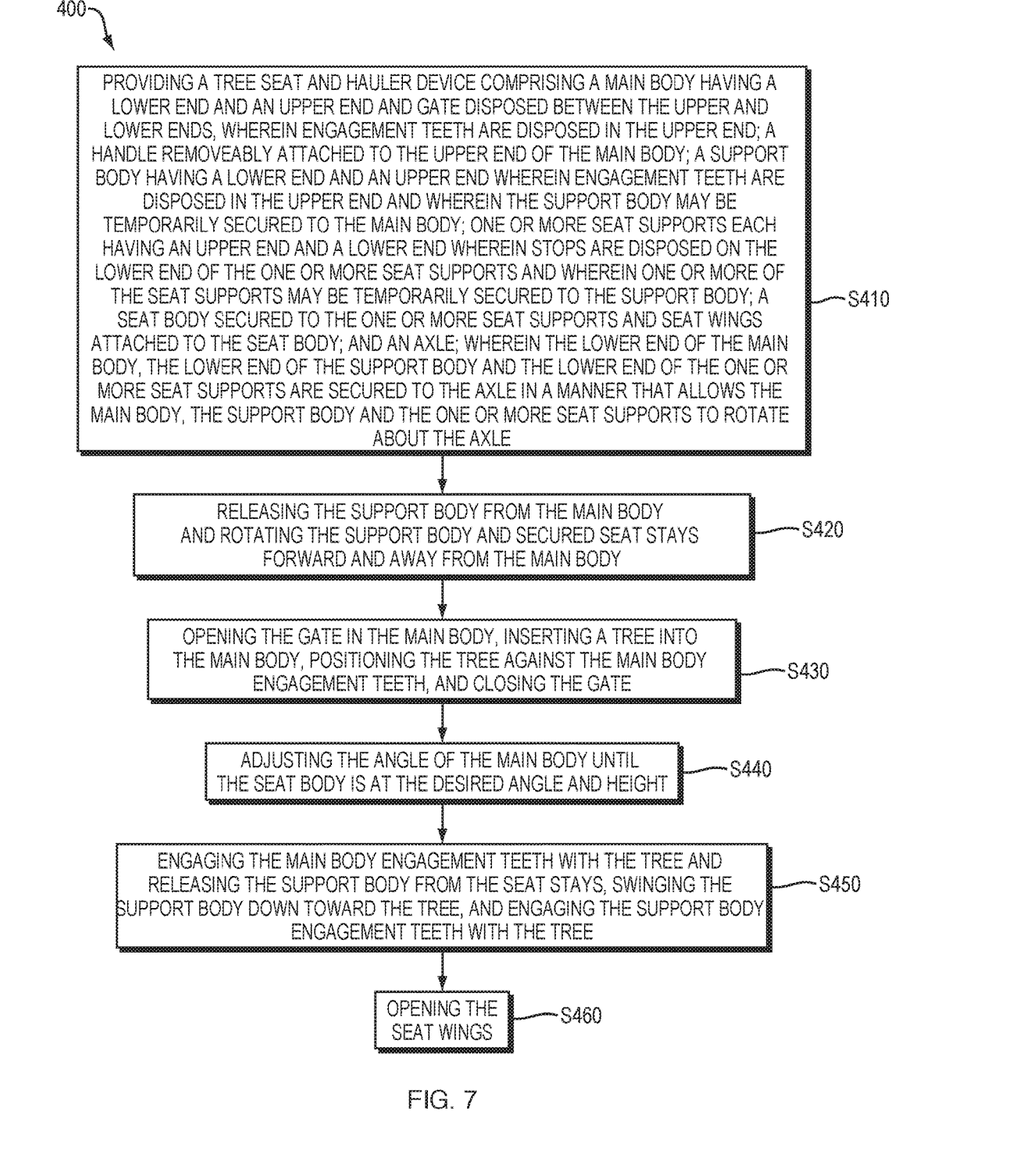
FIG. 7 shows the steps of one method of the present invention.

Turning to FIG. 7, a second method 400 for installing the tree seat and hauler device 100 in a tree in the tree seat position is depicted. A first step S410 comprises providing a tree seat and hauler device 100. A Second step S420 comprises releasing the support body 20, which remains secured to the seat assembly 30, from the main body 10, which may include retracting retractable pin 16, and rotating the support body 20 and attached seat assembly 30 forward and away from the main body 10. Once the main body 10 is clear, a third step S430 comprises opening the gate 15, inserting a tree into the main body 10, positioning the tree against the main body teeth assembly 12, and closing the gate 15. The opening and closing of the gate may be achieved by releasing and then engaging retractable pin 18. Once the tree is positioned within the main body 10, a fourth step S440 comprises adjusting the angle of the main body 10 until the seat assembly 30 is at the desired angle and height. With the seat assembly 30 at the desired angle and height, a fifth step S450 comprises engaging the main body teeth assembly 12 with the tree and releasing the support body 20 from the seat stays 38, allowing the support body 20 to swing down and the support body teeth assembly 22 to engage the tree. A final step S460 comprises opening the seat wings 34 so that the tree seat and hauler device 100 is ready to function as a tree seat.

Figure 8:
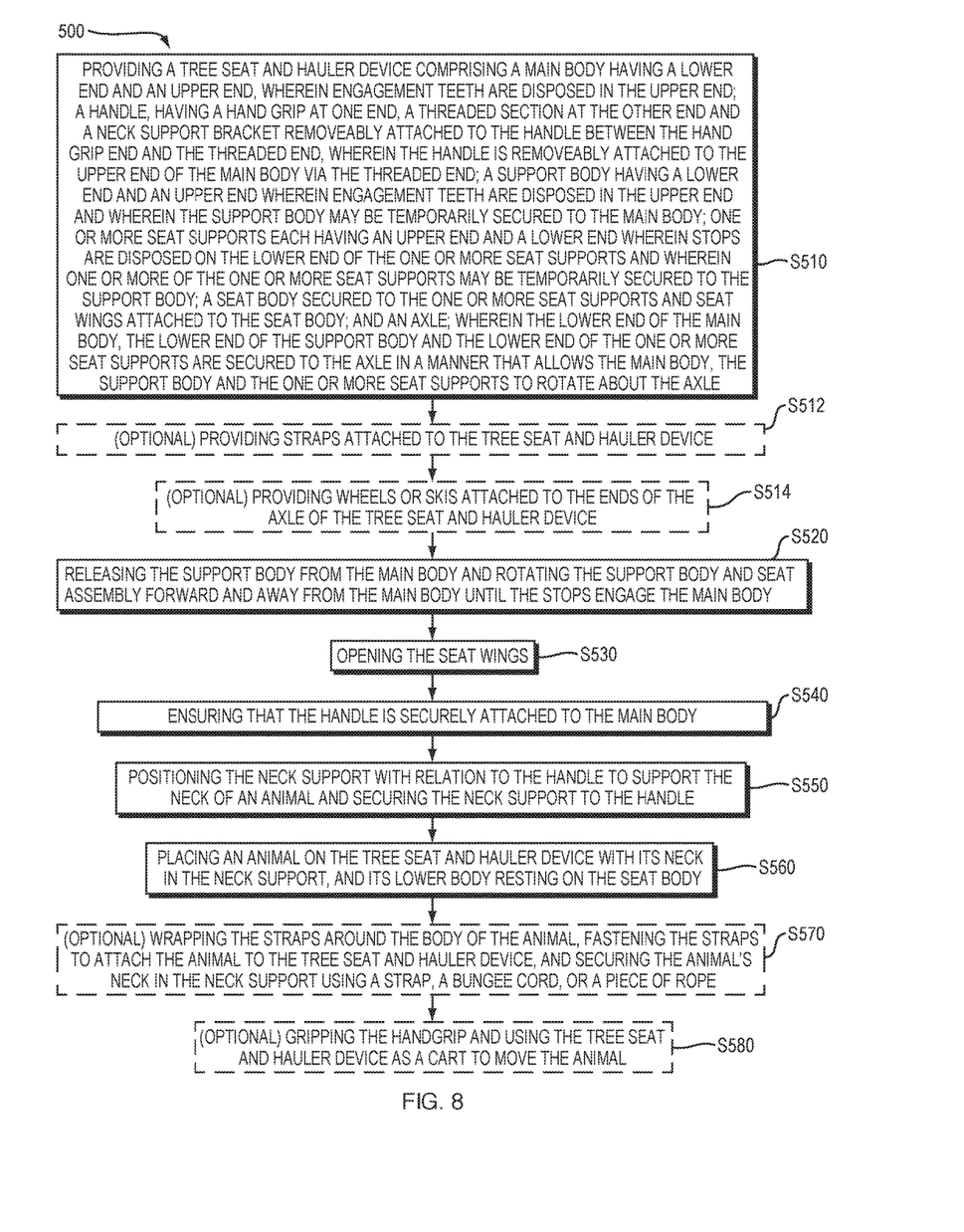
FIG. 8 shows the steps of one method of the present invention.

Turning to FIG. 8, a third method 500 for loading and hauling an animal with the tree seat and hauler device 100 of the present invention is depicted. A first step, S510 comprises providing a tree seat and hauler device 100. Optionally, step S512 comprises providing steps attached the provided tree seat and hauler device and step 514 comprises providing wheels or ski attached to the ends of the axle of the provided tree seat and hauler device. A second step S520 comprises releasing the support body 20, which remains secured to the seat assembly 30, from the main body 10 and rotating the support body 20 and seat assembly 30 forward and away from the main body 10 until the stops 40 engage the main body 10. With support body 20 and the seat assembly 30 fully rotated, a third step S530 comprises opening the seat wings 34. A fourth step S540 comprises ensuring that the handle 50 is securely attached to the main body, preferably by installing the handle 50 in the handle attachment post 11 by engaging the threaded end 52 of the handle 50 with the nut 13 and tightening the handle into place. A fifth step S550 comprises positioning the neck support 60 with relation to the handle to support the neck of an animal and securing the neck support 60 to the handle 50. With the tree seat and hauler device 100 configured in the hauling position, a sixth step S560 comprises placing an animal on the tree seat and hauler device 100 with its neck in the neck support 60, its lower body resting on the seat assembly 30. In some embodiments of the tree seat and hauler device, the animal's midsection will be further supported by the auxiliary support bracket 64. An optional seventh step S570 comprises wrapping the straps 90 around the body of the animal, fastening the straps to attach the animal to the tree seat and hauler device 100, and securing the animal's neck in the neck support 60 using a strap, a bungee cord, or a piece of rope. In additional, an optional eighth step S580 comprises gripping the handgrip and using the tree seat and hauler device 100 as a cart to move the animal.

It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:
1. A combined tree seat and hauler device comprising:
   a. an axle having a first end and second end;
   b. a main body having a curved upper portion, a main body arm and a main body gate arm,
      i. wherein a main body teeth assembly, which includes a series of teeth, is disposed in the curved upper portion of the main body such that the teeth of the main body teeth assembly are oriented substantially inwards toward the axle, and
      ii. wherein the main body arm extends from one side of the curved upper portion and extends to and is securely connected to the axle at a lower end of the main body arm and wherein a main body gate arm extends from the opposite side of the curved upper portion, extends toward the axle and terminates at a lower end such that the main body gate arm does not extend all the way to the axle;
      iii.
   c. a gate extending between the axle and the lower end of the main body gate arm wherein the gate is securely connected to the axle and is removably connected to the lower end of the main body gate arm;
   d. a handle removably attached to the upper end of the main body;
   e. a support body having a curved upper portion and a pair of support body arms,
      i. wherein a support body teeth assembly, which includes a series of teeth, is disposed in the curved upper portion of the support body such that the teeth of the support body teeth assembly are oriented substantially outwards away from the axle, and
      ii. wherein the pair of support body arms originate at each side of the curved upper portion of the support body, extend to the axle and are securely connected to the axle at a lower end of each of the pair of support body arms;
      iii.
   f. one or more seat supports each including an upper end and a lower end, wherein the lower end of the one or more seat supports is securely connected to the axle in a manner that permits the one or more seat supports to rotate about the axle;
   g. stops disposed on the lower end of the one or more seat supports to limit the rotation of the seat supports about the axle; and h. a seat body secured to one or more of the one or more seat supports.

2. The combined tree seat and hauler device of claim 1 further comprising wheels attached to the first end and second end of the axle.

3. The combined tree seat and hauler device of claim 2 further comprising axle spacers covering a portion of the axle between the main body and the wheels.

4. The combined tree seat and hauler device of claim 1 further comprising skis attached to the first end and second end of the axle via a connection block.

5. The combined tree seat and hauler device of claim 1 further comprising straps secured to the main body.

6. The combined tree seat and hauler device of claim 1 further comprising straps secured to one or more attachment loops.

7. The combined tree seat and hauler device of claim 1 further comprising a seat assembly spacer covering a portion of the axle between the seat supports.

8. The combined tree seat and hauler device of claim 1 further comprising an auxiliary support bracket attached to a handle attachment post that extends from the upper end of the main body.

9. The combined tree seat and hauler device of claim 1 wherein the handle is extendable.

10. A method for installing a combined tree seat and hauler device in a tree comprising:
 a. providing a combined tree seat and hauler device comprising
  i. an axle having a first end and second end;
  ii. a main body having a curved upper portion, a main body arm and a main body gate arm,
   1. wherein a main body teeth assembly, which includes a series of teeth, is disposed in the curved upper portion of the main body such that the teeth of the main body teeth assembly are oriented substantially inwards toward the axle, and
   2. wherein the main body arm extends from one side of the curved upper portion and extends to and is securely connected to the axle at a lower end of the main body arm and wherein a main body gate arm extends from the opposite side of the curved upper portion, extends toward the axle and terminates at a lower end such that the main body gate arm does not extend all the way to the axle;
  iii. a gate extending between the axle and the lower end of the main body gate arm wherein the gate is securely connected to the axle and is removably connected to the lower end of the main body gate arm;
  iv. a handle removably attached to the upper end of the main body;
  v. a support body having a curved upper portion and a pair of support body arms,
   1. wherein a support body teeth assembly, which includes a series of teeth, is disposed in the curved upper portion of the support body such that the teeth of the support body teeth assembly are oriented substantially outwards away from the axle, and
   2. wherein the pair of support body arms originate at each side of the curved upper portion of the support body, extend to the axle and are securely connected to the axle at a lower end of each of the pair of support body arms;
  vi. one or more seat supports each including an upper end and a lower end, wherein the lower end of the one or more seat supports is securely connected to the axle in a manner that permits the one or more seat supports to rotate about the axle;
  vii. stops are disposed on the lower end of the one or more seat supports to limit the rotation of the seat supports; and
  viii. a seat body secured to one or more of the one or more seat supports, the seat body including seat wings;
 b. rotating the support body and the seat body forward and away from the main body until the stops engage the main body;
 c. opening the gate, inserting a tree into the main body, positioning the tree against the main body engagement teeth, and closing the gate;
 d. adjusting the angle of the main body until the seat body is at the desired angle and height;
 e. engaging the main body engagement teeth with the tree and rotating the support body down toward the tree, and engaging the support body engagement teeth with the tree; and
 f. opening the seat wings.

11. The method for installing a combined tree seat and hauler device in a tree of claim 10 wherein the provided tree seat and hauler device further comprises straps attached to one or more attachment loops.

12. The method for installing a combined tree seat and hauler device in a tree of claim 10 wherein the provided tree seat and hauler device further comprises wheels attached to the first end and second end of the axle.

13. A method for loading and hauling an animal with a combined tree seat and hauler device comprising:
 a. providing a combined tree seat and hauler device comprising:
  i. an axle having a first end and second end;
  ii. a main body having a curved upper portion, a main body arm and a main body gate arm,
   1. wherein a main body teeth assembly, which includes a series of teeth, is disposed in the curved upper portion of the main body such that the teeth of the main body teeth assembly are oriented substantially inwards toward the axle, and
   2. wherein the main body arm extends from one side of the curved upper portion and extends to and is securely connected to the axle at a lower end of the main body arm and wherein a main body gate arm extends from the opposite side of the curved upper portion, extends toward the axle and terminates at a lower end such that the main body gate arm does not extend all the way to the axle;
  iii. a gate extending between the axle and the lower end of the main body gate arm wherein the gate is securely connected to the axle and is removably connected to the lower end of the main body gate arm;
  iv. a handle removably attached to the upper end of the main body;
  v. a support body having a curved upper portion and a pair of support body arms,
   1. wherein a support body teeth assembly, which includes a series of teeth, is disposed in the curved upper portion of the support body and such that the teeth of the support body teeth assembly are oriented substantially outwards away from the axle, and
   2. wherein the pair of support body arms originate at each side of the curved upper portion of the support body, extend to the axle and are securely connected to the axle at a lower end of each of the pair of support body arms;
  vi. one or more seat supports each including an upper end and a lower end, wherein the lower end of the one or more seat supports is securely connected to the axle in a manner that permits the one or more seat supports to rotate about the axle;
  vii. stops are disposed on the lower end of the one or more seat supports to limit the rotation of the seat supports about the axle; and
  viii. a seat body secured to one or more of the one or more seat supports, the seat body including seat wings;
 b. rotating the support body and the seat body forward and away from the main body until the stops engage the main body;
 c. opening the seat wings;
 d. ensuring that the handle is securely attached to the main body;
 e. positioning a neck support with relation to the handle to support the neck of an animal and securing the neck support to the handle; and
 f. placing an animal on the combined tree seat and hauler device with its neck in the neck support, and its lower body resting on the seat body.

14. The method for loading and hauling an animal with a combined tree seat and hauler device of claim 13 wherein the provided combined tree seat and hauler device further comprises straps attached to the main body and wherein the method further comprises the additional steps of wrapping the straps around the body of the animal, fastening the straps to secure the animal to the combined tree seat and hauler device, and securing the animal's neck in the neck support using a strap, a bungee cord, or a piece of rope.

15. The method for loading and hauling an animal with a combined tree seat and hauler device of claim 14 wherein the provided combined tree seat and hauler device further comprises wheels attached to the first end and second end of the axle and wherein the method further comprises the additional step of gripping the handle and using the combined tree seat and hauler device as a cart to move the animal.

16. The method for loading and hauling an animal with a combined tree seat and hauler device of claim 14 wherein the provided combined tree seat and hauler device further comprises skis attached to the first end and second end of the axle via a connection block and wherein the method further comprising the additional step of gripping the handle and using the combined tree seat and hauler device as a cart to move the animal.

17. The method for loading and hauling an animal with a combined tree seat and hauler device of claim 13 wherein the provided combined tree seat and hauler device further comprises straps attached to one or more attachment loops and wherein the method further comprising the additional step of wrapping the straps around the body of the animal, fastening the straps to attach the animal to the combined tree seat and hauler device, and securing the animal's neck in the neck support using a strap, a bungee cord, or a piece of rope.

18. The method for loading and hauling an animal with a combined tree seat and hauler device of claim 17 wherein the provided combined tree seat and hauler device further comprises wheels attached to the first end and second end of the axle and wherein the method further comprising the additional step of gripping the handle and using the combined tree seat and hauler device as a cart to move the animal.

19. The method for loading and hauling an animal with a combined tree seat and hauler device of claim 17 wherein the provided combined tree seat and hauler device further comprises skis attached to the first end and second end of the axle via a connection block and wherein the method further comprising the additional step of gripping the handle and using the combined tree seat and hauler device as a cart to move the animal.

* * * * *